(12) United States Patent
Pavao et al.

(10) Patent No.: US 6,419,300 B1
(45) Date of Patent: Jul. 16, 2002

(54) OUTSIDE SIDEVIEW MIRROR ASSEMBLY WITH REDUCED WIND NOISE

(75) Inventors: Leo W. Pavao; Tun-Jen Chu, both of Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 09/482,199

(22) Filed: Jan. 12, 2000

(51) Int. Cl.[7] .................................................. B60R 1/06
(52) U.S. Cl. ...................... 296/180.1; 296/152; 359/549
(58) Field of Search ............................. 296/180.1, 152; 359/549, 841; 248/475.1, 476

(56) References Cited

U.S. PATENT DOCUMENTS 5,942,324 A   8/1999   Chu et al. .................... 428/323

FOREIGN PATENT DOCUMENTS

| DE | 4039484 C2 | 6/1992 |
| DE | 19543888 A1 | 5/1996 |
| DE | 29704058 U1 | 5/1997 |
| EP | 0259064 A1 | 3/1988 |
| EP | 0703275 A1 | 3/1996 |

*Primary Examiner*—Joseph D. Pape
*Assistant Examiner*—Patricia Engle
(74) *Attorney, Agent, or Firm*—Van Dyke, Gardner, Linn & Burkhart, LLP (57) ABSTRACT

A vehicular sideview exterior mirror assembly includes a body, which is adapted for mounting to a vehicle, and a reflective element supported in the body' cavity and positioned in an opening of the body which faces rearward of a vehicle when the mirror assembly is mounted to a vehicle. The body has a forward facing side, with at least a portion of the forward facing side including decorative film molded therewith. The portion of the forward facing side includes a surface discontinuity formed therein to reduce the wind noise of the sideview exterior mirror assembly when mounted to a vehicle.

47 Claims, 8 Drawing Sheets

OUTSIDE SIDEVIEW MIRROR ASSEMBLY WITH REDUCED WIND NOISE

TECHNICAL FIELD AND BACKGROUND OF THE INVENTION

The present invention relates to an exterior sideview mirror assembly suitable for mounting on a vehicle and, more particularly, to an exterior sideview mirror assembly which incorporates a skullcap or shell or scalp to provide a decorative appearance to the assembly.

Conventionally, vehicles are equipped with at least a driver's side exterior mirror assembly, which is mounted either to the body of the vehicle or in the door frame of the vehicle. More often, vehicles are also equipped with a passenger side exterior mirror assembly which is typically mounted to the opposite side of the vehicle in a similar fashion to the driver's side exterior mirror assembly. The trend in exterior rearview mirror assemblies has been to form an exterior mirror assembly which exhibits better aerodynamic characteristics and, further, which has an aesthetic appearance, preferably with the exterior mirror assembly being decorated to have a high gloss and/or to match the vehicle body paint.

However, more recently in an attempt to reduce the cost of manufacturing such assemblies, a composite assembly has been developed which includes a frame and a shell or skullcap or scalp, which is mounted to the frame, for example by snap connectors. The frame is formed from an engineering plastic, typically a reinforced engineering plastic, such as reinforced nylon or the like. The shell or skullcap is also formed from a plastic substrate which is then painted to match the vehicle body color. The structural capacity of the housing is provided by the frame, with the shell providing a decorative covering over the frame so that the housing generally matches the vehicle body. As a result, however, the wind noise of the side exterior mirror assembly can be increased. This wind noise is generated such as by the space between the decorative shell and the frame of the mirror assembly.

Various attempts have been made to minimize and/or eliminate the wind noise. One approach is to eliminate the space between the decorative shell and the frame. However, in order to eliminate the space, the tolerances on the respective parts must be extremely tight, which adds the expense of the sideview exterior mirror assembly fabrication. Another approach is to alter the surface topology of the decorative shell to separate the air flow over the side exterior mirror assembly, which reduces the noise of the wind flow. For example, in German Patent 4,039,484 to Bayerische Motoren Werke AG, a plurality of raised portions or "bumps" are provided to separate the air flow over the housing. However, these raised portions are not aesthetically pleasing to some automobile manufacturers and, further, project above the assembly and create a distraction to the driver. In addition, it has been found that when a discontinuity is introduced into the substrate of the skullcap (such as when it is molded in a molding tool), that the noise reduction advantages of such a surface molded discontinuity is reduced drastically by the painting process which follows since the painting process alters the surface topology of the substrate and, rather than following the surface discontinuities, at least partially fills in the discontinuities.

Consequently, there is a need for an exterior rearview mirror assembly which incorporates a decorative skullcap that exhibits reduced noise while retaining the aesthetic appearance of the mirror assembly.

SUMMARY OF THE INVENTION

The present invention provides a sideview mirror assembly which incorporates a decorative shell, more specifically a colored shell, and most preferably of a color that matches the color of the vehicle body. The decorative shell includes a surface discontinuity to reduce the wind noise of the sideview mirror assembly. In order to maintain the geometry of the surface discontinuity, a composite decorative shell is provided which is formed from a shell substrate and a decorative film that is molded with the shell substrate so as to substantially maintain the geometry, such as sharpness, of the discontinuity.

In one form of the invention, a vehicular sideview exterior mirror assembly includes a body which is adapted for mounting to a vehicle, with the body having a mirror case wall defining a cavity and an opening for facing rearward of the vehicle. The reflective element is housed in the cavity and positioned in the opening for rearward viewing of the vehicle. The body includes a forward facing portion which is decorated and which forms an exterior surface discontinuity to reduce the wind noise of the vehicle sideview exterior mirror assembly. The forward facing portion is decorated by a decorative film which is molded with the forward facing portion of the body.

In one form, the surface discontinuity comprises a ridge. For example, the ridge is preferably substantially continuous having a pair of terminal ends, which may be tapered. In other aspects, the body includes a decorative shell mounted therein which defines a groove between the shell and the body. The ridge is preferably spaced from the groove. In a further aspect, the ridge has a longitudinal extent which is generally parallel with the groove. In other aspects, the body includes a perimeter edge which extends around the opening, with the groove being spaced a groove distance from the perimeter edge of the case wall, and the ridge being spaced at least a ridge distance from the groove, wherein the ridge distance is at least equal to the groove distance.

In yet further aspects, the shell and the body define a substantially continuous forward facing exterior surface. The ridge preferably forms a step in the substantially continuous surface. For example, the step may have a maximum height in a range of 0.25 to 5.0 mm, more preferably in a range of 0.5 to 4.0 mm and, most preferably a maximum height in a range of 1.0 mm to 2.0 mm.

In another form of the invention, a vehicular sideview exterior mirror assembly includes a reflective element and a mirror case which has a mirror case wall defining a cavity and an opening for facing rearward of the vehicle. The mirror case is adapted to mount to the vehicle and houses the reflective element in the mirror case cavity in the opening for rearward viewing of the vehicle. A shell member, which is adapted to secure to the case wall, is positioned exteriorly over a forward facing portion of the case wall. The shell member has an exterior decorative film molded therewith to enhance the aesthetic appearance of the vehicular sideview exterior mirror assembly and which forms an exterior surface discontinuity to reduce the wind noise of the mirror assembly.

In one aspect, the surface discontinuity comprises a ridge. Preferably, the ridge has a longitudinal extent which extends along at least a portion of a lateral extent of the mirror case. Further, the shell member and the case wall define a substantially continuous exterior surface, with the ridge defining a step in the substantially continuous exterior surface.

In yet another form of the invention, a vehicular sideview exterior mirror composite shell member for a vehicular sideview exterior mirror assembly is formed by providing a decorative film substrate having an inner facing surface and an outer facing surface for facing exteriorly of the mirror assembly when the composite shell member is mounted to the mirror assembly. The decorative film is placed in a molding apparatus which includes a mold cavity having a discontinuity formed therein with an edge definition. The decorative film is placed in the mold cavity, and a polymer resin is injected into the mold cavity over the film such that the film and polymer resin conform to the mold cavity and further conform to the edge definition of the discontinuity such that the outer facing surface of the film forms a surface discontinuity for reducing the wind noise characteristics of the composite shell.

In one aspect, the decorative film substrate is provided as a pre-formed decorative film substrate. For example, the pre-formed decorative film substrate may include a surface discontinuity formed therein to reduce the stretching of the film substrate when molded in the molding apparatus.

In other aspects, the mold cavity forms a ridge on the composite shell to form the surface discontinuity. In further aspects, the ridge forms a step in the outer facing surface of the composite shell. In preferred form, the surface discontinuity further includes a ramp along at least a portion of the step to further enhance the wind noise reduction of the composite shell member.

These and other features, purposes, and advantages will be appreciated when the drawings are viewed in conjunction with the detailed description which follows.

DETAILED DESCRIPTION OF THE PREFERRED EMBODIMENTS

Figure 1:
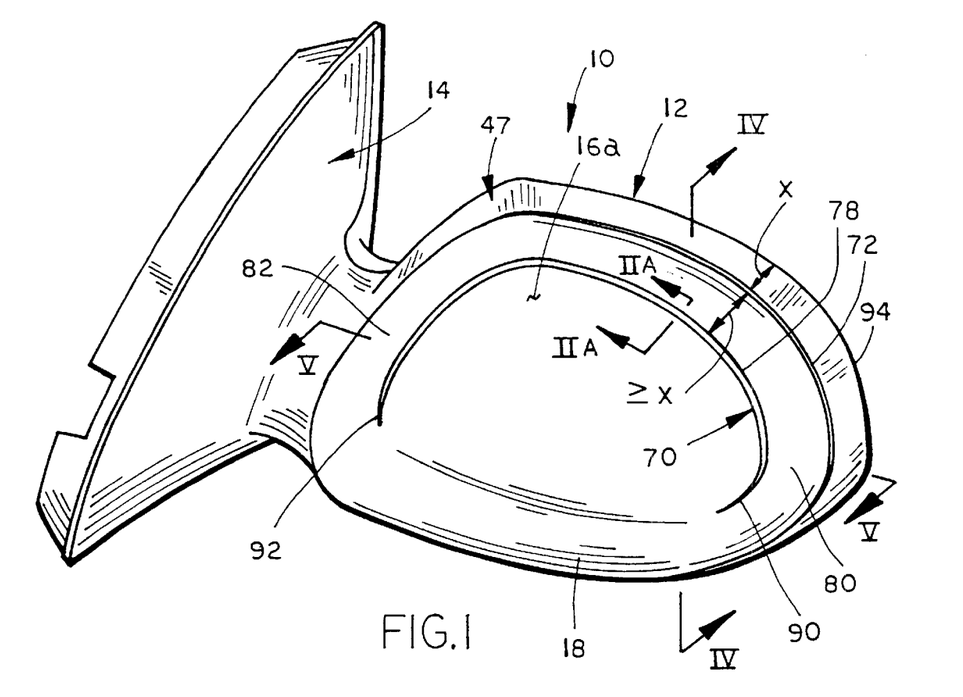
FIG. 1 illustrates a perspective view of an exterior vehicular rearview mirror assembly incorporating a composite skullcap of the present invention.

Referring to FIG. 1, the numeral 10 generally designates a vehicular sideview exterior mirror assembly of the present invention. Sideview mirror assembly 10 includes a mirror housing or case 12 and a mounting bracket or sail 14, which mounts mirror case 12 to the vehicle. In the illustrated embodiment, mirror case 12 is integrally formed with sail 14, but it should be understood that mirror case 12 and sail 14 may be separately formed with mirror case 12 being mounted to sail 14, for example, by a break-away mounting arrangement. Mirror case 12 and sail 14 are preferably molded from an engineering polymer resin, such as a reinforced or filled polymer resin. Such reinforced polymer resins include a filled nylon, such as, a mineral filled nylon, including a glass filled nylon. As will be more fully described below, a composite shell member 16 is mounted to the forward facing side of the mirror case 12 to provide a decorative appearance to mirror assembly and which preferably has a high gloss finish, more preferably, a colored high gloss finish and, most preferably, with a color that matches the body paint of the vehicle. Composite shell member 16 includes a shell substrate 17 and a decorative film or film substrate 18 and, further, a surface discontinuity 70 to substantially reduce the wind noise of assembly 10 when assembly 10 is mounted to a vehicle.

Figure 2:
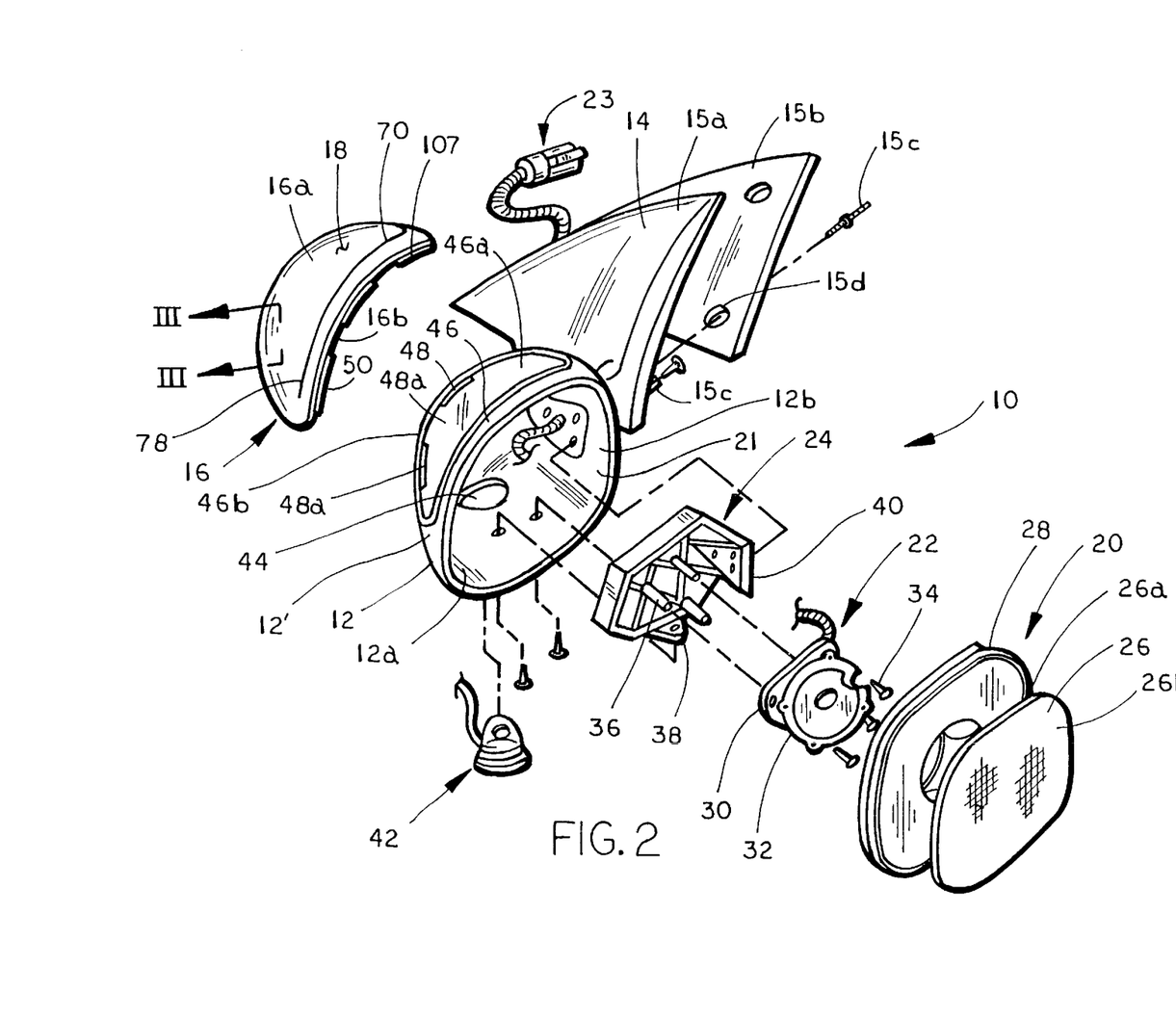
FIG. 2 is an exploded perspective view of the exterior rearview mirror assembly of FIG. 1.
Figure 2A:
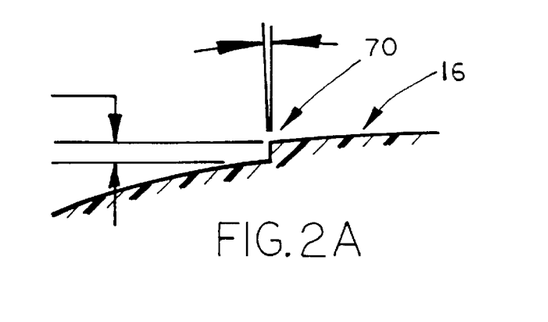
FIG. 2A is a cross-section taken along line IIA—IIA of FIG. 1.

Referring to FIG. 2, mirror assembly 10 includes a reflective element assembly 20 positioned in case 12 in a rearward facing opening 21. Reflective element assembly 20 is mounted in mirror case 12 by an actuator 22. The orientation of mirror assembly 20 is adjustable by actuator 22 in response to a control 23. Control 23 can comprise a handset control that allows the driver manually to move the orientation of reflective element assembly 20, for example, by a lever control or by cable control such as a BODEN cable control, which repositions the rearward field of view of reflective element assembly 20 in sideview exterior mirror assembly 10. When actuator 22 comprises an electrically actuated actuator, which includes at least one motor and telescoping positioning members, control 23 may comprise a switch or further or alternately, may comprise a memory controller as is known in the automobile mirror art, that controls actuator 22 to move and reorient reflective element 20 in assembly 10. Actuator 22 supports reflective element assembly 20 in case 12 on a mounting bracket 24.

Reflective element assembly 20 includes a reflective element 26 and a backing plate 28, which supports reflective element 26 and, further, provides a mounting surface for actuator 22 described below. Reflective element 26 preferably comprises a reflector coated glass substrate. For example, reflective element 26 may comprise a flat glass substrate coated with a metallic reflector coating, such as chromium coating, titanium coating, a rhodium coating, a metal alloy coating, a nickel alloy coating, a silver coating, an aluminum coating, or any alloy or combination of these metal reflectors. The metal reflector coating of reflective element 26 may comprise a fist surface coating, such as on outer surface 26b, or a second surface coating, such as on rearward surface 26a, as such terms are known in the mirror art In addition, the reflector coating on reflective element 26 may also comprise a dielectric coating or a multi layer of dielectric coatings or a combination of a metal layer and a dielectric layer to form an automotive mirror reflector as is known in the art. Furthermore, reflective element 26 may comprise an electro-optic reflector element, such as an electrochromic reflector element, which exhibits a variable reflectance level, also as is known in the art. It should also be understood that reflective element assembly 20 may include a curved reflector such as a convex, spherically curved reflector. Furthermore, reflective element assembly 20 may include a plano-auxiliary reflective element assembly as described in co-pending application entitled EXTERIOR MIRROR PLANO-AUXILIARY REFLECTIVE ELEMENT ASSEMBLY, Ser. No. 09/478,315, filed Jan. 6, 2000, by Niall R. Lynam, which is commonly assigned to Donnelly Corporation, which is hereby incorporated by reference in its entirely.

Where reflective element 26 comprises an electrochromic element, for example the electrochromic element typically includes a front substrate and a rear substrate with an electrochromic medium disposed between the substrates. A suitable electrochromic medium includes a solid polymer matrix electrochromic medium, for example such as disclosed in U.S. patent application Ser. No. 091350,930, filed Jul. 12, 1999, entitled ELECTROCHROMIC POLYMERIC SOLID FILMS, MANUFACTURING ELECTROCHROMIC DEVICES USING SUCH FILMS, AND PROCESS FOR MAKING SUCH SOLID FILMS AND DEVICES, to Desaraju V. Varaprasad et al., flow U.S. Pat. No. 6,154,306, or such as disclosed in U.S. Pat. Nos. 5,668,663; 5,724,187; 5,910,854; and 5,239,405, the disclosures of which are incorporated in their entireties by reference herein. Most preferably, in such laminate type electrochromic mirror reflective elements, the front substrate comprises a glass plate having, for example a thickness of less than about 0.1 mm, most preferably about 1.1 mm thickness or lower, and the rear substrate comprises a glass plate, for example having a thickness equal to or greater than about 1.6 mm and, more preferably greater than about 1.8 mm thickness, most preferably equal to or greater than about 2.0 mm thickness. The rear most surface of the rear substrate (the fourth race as is known in the mirror art), is coated with a high reflecting metal film such as of aluminum or silver, or U.S. Pat. No. 6,168,279, and to U.S. Pat. Nos. 5,900,999; 5,986,354, all commonly assigned to Donnelly Corporation of Holland, Mich., the disclosures of which ate herein incorporated by reference in their entireties. An example of a suitable mounting bracket can be found in pending U.S. patent application entitled FILLED POLYOLEFIN MIRROR SUPPORT, Ser. No. 09/097,480, filed Jun. 15, 1998, now U.S. Pat. No. 6,109,586, which is incorporated by reference herein in its entirety.

In the illustrated embodiment, actuator 22 comprises an electric actuator which includes an actuator housing 30 and a pivot member 32, which is pivoted about actuator housing 30 by a plurality of telescoping members which extend from and retract into housing 30, as will be understood by those skilled in the art. Pivot member 32 is secured to backing plate 28 by a plurality of fasteners 34 such that when telescoping members are actuated to extend or retract into actuator housing 30, the orientation of the reflective element assembly 20 is moved about one or more axes to adjust the orientation of reflective element 26 in case 12. Attachment of reflective element 26 to backing plate 28 can be achieved by a mechanical attachment, such as by a tab, clip, or fastener or may be by an adhesive attachment such as by a silicone adhesive, a urethane adhesive or similar adhesive material, such as a tape coated on both surfaces with a pressure sensitive adhesive to form a double sticky tape. Actuator housing 30 is rigidly mounted to bracket 24 on a plurality of mounting bosses 36 and may be either heat staked or secured to mounting bosses 36 by fasteners, as will be understood by those skilled in the art. In the illustrated embodiment, bracket 24 is mounted to mirror case 12 by a plurality of fasteners which extend through a bottom wall 12a of mirror case 12 into corresponding mounting tabs 38 provided on bracket 24. In addition, bracket 24 includes a mounting flange 40 which is secured to side wall 12b of mirror case 12, similarly by a plurality of fasteners. In this manner, actuator housing 30 is rigidly mounted to mirror case 12. It should be understood that mirror assembly 10 may include a fixed reflective element assembly or include other actuators, such as a manual actuator or a remote manual actuator such as a BODEN cable actuator. In addition, for further details of suitable actuators reference is made to copending application entitled PIVOT SUPPORT FOR ADJUSTABLE REARVIEW MIRROR, Ser. No. 09/047,846, filed Mar. 25, 1998, and to U.S. Pat. Nos. 5,900,999; 5,986,354, all commonly assigned to Donnelly Corporation of Holland, Mich., the disclosures of which are herein incorporated by reference in their entireties. An example of a suitable mounting bracket can be found in pending U.S. patent application entitled FILLED POLYOLEFIN MIRROR SUPPORT, Ser. No. 09/097,480, filed Jun. 15, 1998, which is incorporated by reference herein in its entirety.

Again referring to FIG. 2, mirror assembly 10 may further include a light module 42 mounted in an opening 44 provided in bottom wall 12a of mirror case 12. Light module 42 may provide ground illumination to form a security light or the like. In addition, a signal light may be incorporated into assembly 10. For further details of preferred forms of light module 42 or signal lights which may be incorporated into assembly 10, reference is made to US. Pat. Nos. 5,8123,654; 5,669,704; 5,497,306; 5,669,705; 5,879,074; and 5,863,116, and pending U.S. patent application Ser. Nos. 09/174,757, entitled UNIVERSAL EXTERIOR VEHICLE SECURITY LIGHT, now U.S. Pat. No. 6,149,287; Ser. No. 09/102,414, entitled VEHICLE EXTERIOR MIRROR SYSTEM WITH SIGNAL LIGHT, now US. Pat. No. 6,176,602, respectively, all commonly assigned to Donnelly Corporation of Holland, Mich., which are incorporated herein by reference in their entireties.

Mirror case 12, as noted above, is mounted to a vehicle by mounting bracket or sail 14. In the illustrated embodiment, mounting bracket or sail 14 includes a base 15a and a base gasket 15b. Extending rearwardly from base 15a are a plurality of mounting bosses 15c which align with corresponding openings 15d provided in base gasket 15b to receive a corresponding plurality of mounting fasteners 15e, which secure base 15a and in turn mirror case 12 to the vehicle, as will be understood by those skilled in the art. Although described as a fixed mirror casing, mirror casing 12 may be pivotally mounted to base 15a to provide a break-away mounting, such as described in U.S. Pat. No. 5,949,591, or may be mounted with a power-fold mechanism, and further may comprise an extendable casing, such as described in copending application entitled EXTENDABLE EXTERIOR REARVIEW MIRROR ASSEMBLY FOR VEHICLES, Ser. No. 09/399,875, now U.S. Pat. No. 6,116,743, which references are commonly assigned to Donnelly Corporation, and which are hereby incorporated by reference in their entireties.

Mirror case 12 includes a case wall 46, which defines rearward facing opening 21 and a forward facing portion 47. In the illustrated embodiment, forward facing portion 47 includes a mounting spice defined by a recessed area 48. However, it should be understood that forward facing portion 47 may include other configurations of mounting surfaces. Recessed area 48 extends from an upper wall portion 46*a* of case wall 46 to a lower back wall portion or lower forward facing portion 46*b* of case wall 46, As used in this application, the terms "rearward facing" and "forward facing" are used to define directions relative to a vehicle when the mirror assembly is mounted to the vehicle. Rearward facing means the object is facing the rear of the vehicle. Forward facing means that it is facing toward the front end of the vehicle. Recessed area 48 is covered by composite shell 16 which provides an aesthetic appearance for assembly 10 and, preferably, matches the vehicle body paint color. Composite shell 16 is mounted to case wall 46 over recessed area 48 such that the outer surface 16*a* of composite shell 16 is substantially aligned with the outer surface 12' of mirror case 12 to form a substantially continuous exterior surface. Composite shell 16 is secured to casing 12 by a plurality of couplers 50 which are preferably molded on composite shell 16 and extend outwardly from inner surface 16*b* of composite shell 16 to engage corresponding openings 48*a* provided in casing wall 46 and recessed area 48. Couplers 50 may provide for releasable attachment of shell 16 to casing 12 to permit servicing of components within casing 12 or components mounted to shell 16, such as signal lights, ground illumination lights, described above, or antennas or electronic components, including an electronic module described in U.S. patent application Ser. No. 08/702,228 entitled MODULAR REARVIEW MIRROR ASSEMBLY INCLUDING AN ELECTRONIC CONTROL MODULE, filed Aug. 23, 1996, now U.S. Pat. No. 6,019,475, commonly assigned to Donnelly Corporation, the disclosure of which is incorporated herein in its entirety. Other couplers which may be used to secure composite shell 16 comprise conventional snap-fit couplers, which once inserted into the corresponding openings in case wall 46, typically do not permit removal of the composite shell 16 unless broken. However, it should be understood that other couplers may be also used to secure composite shell 16 to case wall 46.

Figure 3:
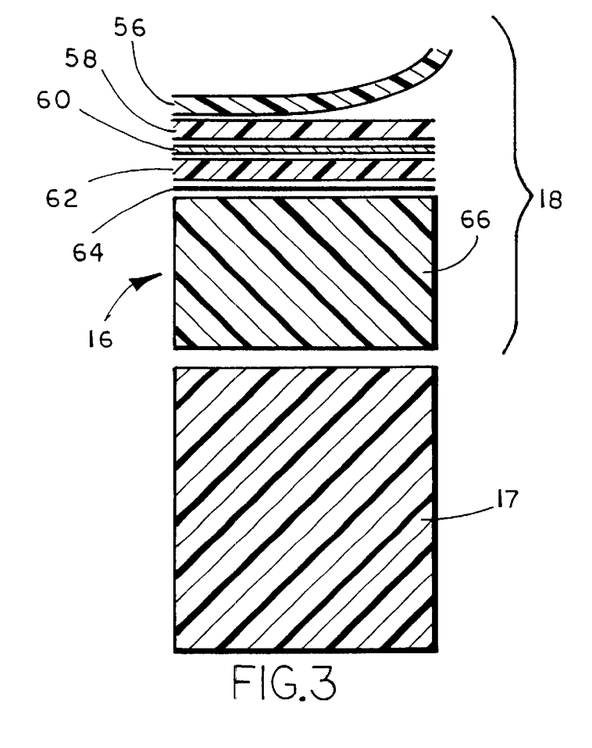
FIG. 3 is an enlarged cross-section view taken along line III—III of FIG. 2.

As best seen in FIG. 3 and as previously noted, composite shell 16 includes shell substrate 17 and decorative film 18. Substrate 17 preferably comprises a suitable polymer resin, such as acrylonitrile butadiene styrene (ABS) material. Film 18 preferably comprises a film laminate, which is a composite of continuous cast coatings that are dried and laminated onto an extruded gel-free thermal plastic backing sheet and commercially available, for example, from Rexam or Avery Dennison. Film 18 preferably includes an outer coating or carrier sheet 56, for example, a PET carrier sheet having a variable thickness, for example in a range of about 0.5 to 5.0 mils, more preferably, in a range of about 1.0 to 3.0 mils and, most preferably, in a range of about 1.5 to 2.5 mils. "Mils" as used herein is a conventional term meaning a thousandth of an inch. Carrier sheet 56 preferably comprises a flexible formable heat resistant polyester film on which paint films may be cast and dried. Under outer coating 56, film 18 includes a clear coat 58 having a thickness in a range, for example of about 0.25 to 4.0 mils, more preferably, about 0.5 to 3.0 mils and, most preferably about 1.0 to 2.0 mils. Clear coating 58 is preferably a dried continuous cast coating of acrylic polyvinylidene diflouride (PVDF) clear coat. Film 18 may also include a design coating 60, for example a GRAVURE printed design. Under coating 60 or coating 58, film 18 includes a base color coating 62, such as PVDF acrylic base color coating having a thickness in a range of about 0.1 to 5.0 mils, more preferably, about 0.25 to 3.0 mils, and, most preferably, about 0.5 to 1.5 mils, for example. In addition, film 18 includes a size or adhesion promoter coating 64 having a thickness in a range of about 0.025 to 0.3 mils, more preferably, about 0.05 to 0.2 mils and, most preferably, about 0.075 to 0.15 mils, which is then laminated onto a thermal plastic backing sheet 66. Coating 64 is preferably a dried continuous cast coating of a thermal plastic adhesion promoter. Backing sheet 66 preferably comprises an ABS or TPO material having a variable thickness, for example, in a range from approximately 10 to 40 mils, more preferably, about 12 to 28 mils and, most preferably, about 15 to 25 mils.

As best seen in FIGS. 2 and 4–6, when molded, composite shell 16 includes surface discontinuity 70. Discontinuity 70 substantially reduces the wind noise of exterior rearview mirror assembly 10. Furthermore, as discontinuity 70 is positioned on the forward facing surface of mirror case 12, discontinuity 70 is not visible to the driver and, therefore, poses no distraction to the driver. Furthermore, as described in more detail below, since discontinuity 70 generally follows existing lines, such as groove 72 or perimeter edge 84 of mirror case 12, discontinuity 70 does not detract from the overall aesthetic appearance of assembly 10.

Figure 4:
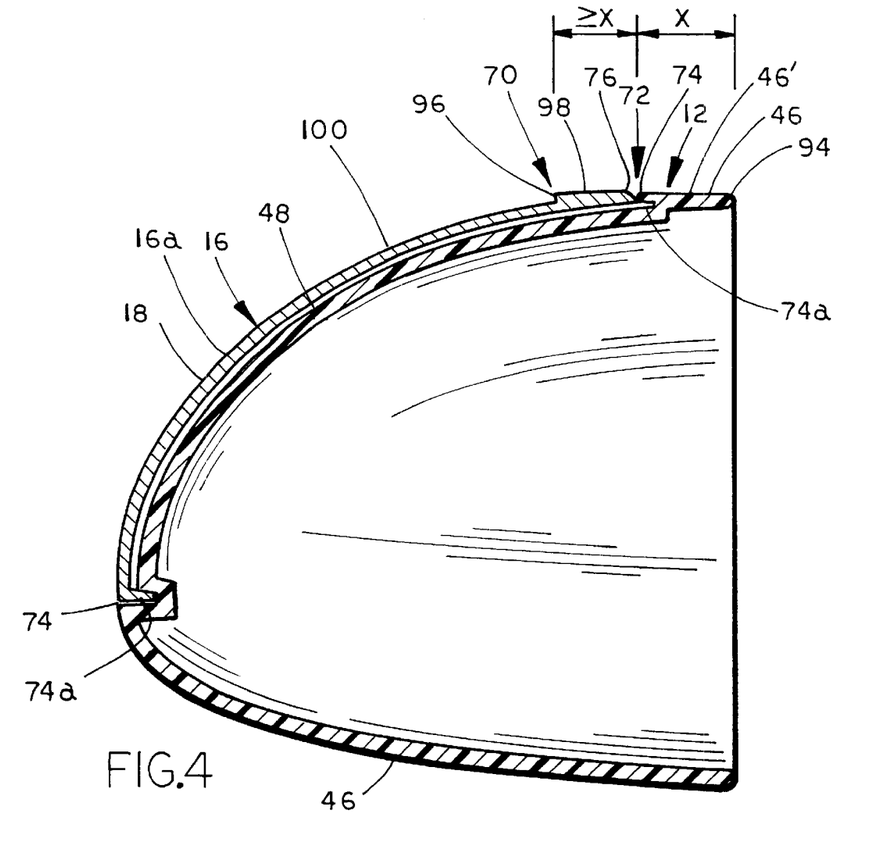
FIG. 4 is a cross-section view taken along line IV—IV of FIG. 1 with the internals of the mirror assembly removed.
Figure 4A:
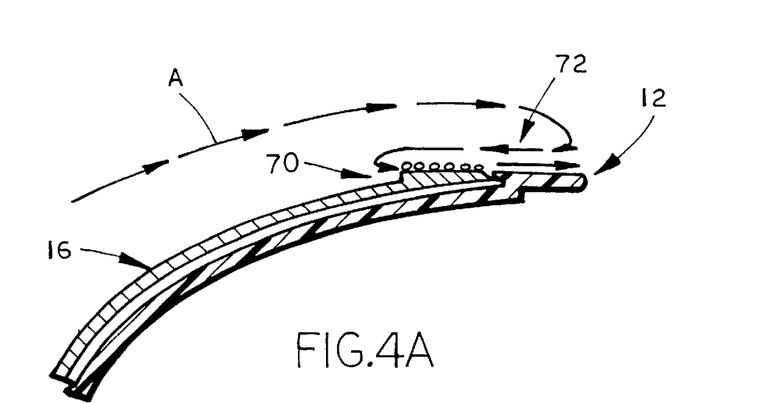
FIG. 4A is an enlarged portion of the cross-section in FIG. 4 generally illustrating the air flow across the top of the mirror assembly.
Figure 5:
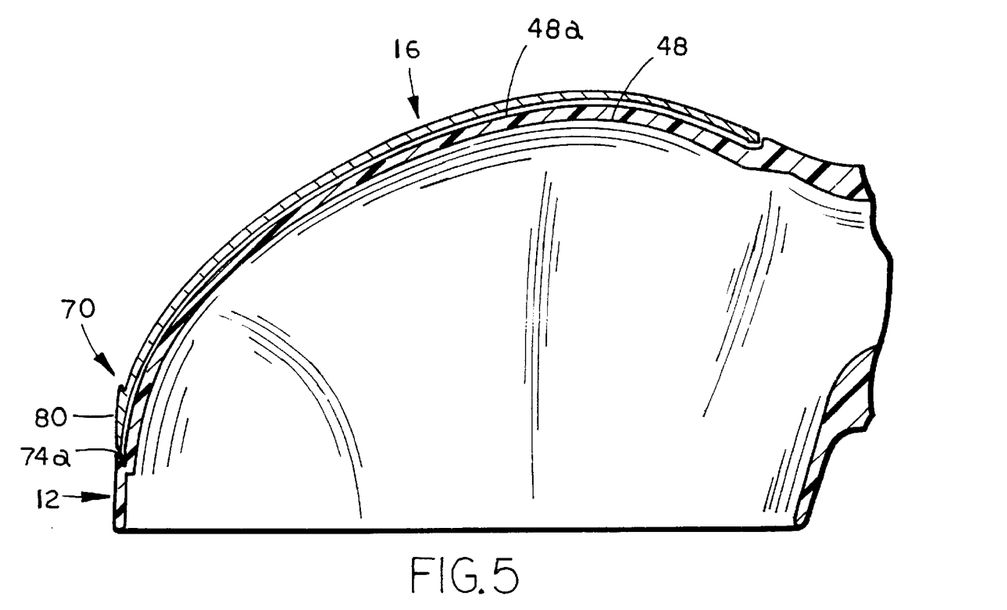
FIG. 5 is an enlarged cross-section view taken along line V—V of FIG. 1 with the internals of the mirror assembly removed.

As best seen in FIG. 4, when composite shell 16 is mounted to casing 12 over recessed area 48, a gap or groove 72 is formed between the perimeter edge 74 of recessed portion 48 and the upper perimeter edge 76 of composite shell 16. Although gap 72 can be minimized, it is not economically desirable or feasible to produce exterior rearview mirror assemblies with such degree of precision to achieve an exact fit-up between shell 16 and mirror case 12. Referring to FIG. 4A, when air flows across upper surface of casing 12, the air generally moves in the path indicated by the arrow A. As the air flow reverses direction, the air flows into groove 72 which causes turbulence which in turn creates noise. To reduce this noise, it has been found that when surface discontinuity 70 is provided and preferably spaced from groove 72 that the wind noise is substantially reduced. By forming a discontinuity spaced from groove 72, the turbulence in the air flow shifts back to discontinuity 70. When the turbulent air flow moves back to groove 72, groove 72 then induces laminar flow in the air again.

Referring again to FIGS. 1 and 2, surface discontinuity 70 preferably comprises a generally arcuate ridge 78. In preferred form, ridge 78 extends from an outboard side 80 of composite shell 16 to an inboard side 82 and is preferably continuous between terminal ends 90 and 92 which taper to form a smooth transition between discontinuity 70 and surface 16*a* of composite shell 16. For example, terminal ends 90 and 92, which wrap inwardly toward each other, may be spaced a distance in a range of about 10 to 35 mm from lower perimeter portion of shell 16, more preferably, about 20 to 30 mm and, most preferably, about 20 to 25 mm. Furthermore, upper portion of ridge 78 is preferably spaced from groove 72 a distance equal to or greater than X, where X is the distance between groove 72 and peripheral edge 94 of mirror case 12. In addition, ridge 78 is preferably substantially parallel with groove 72 over at least a portion of groove 72.

Figures 6, 7:
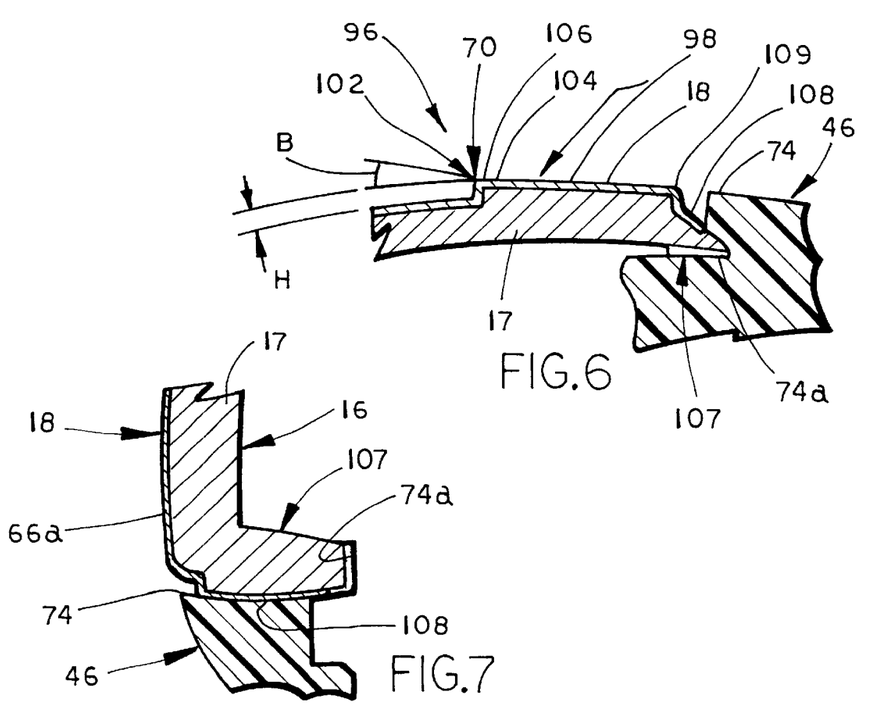
FIG. 6 is an enlarged section view of area VI—VI in FIG. 4.
FIG. 7 is an enlarged section view of area VII—VII in FIG. 4.

Referring again to FIGS. 4–6, surface discontinuity 70 forms a step 96 in outer surface 16*a* of composite shell 16 and, therefore, in the outer surface of mirror housing 12. Step 96 includes an upper portion 98 which is generally flush with upper surface 46' of case wall 46 and a lower portion 100 which is contiguous with the remaining portion of composite shell 16. Referring to FIG. 6, step 96 preferably has a maximum height H in a range of about 0.25 to 5.0 mm, more preferably in a range of about 0.5 to 4.0 mm and, most preferably, about 1.0 to 2.0 mm. The transition apex 102 of step 96 preferably comprises a sharp edge. Furthermore, surface discontinuity 70 optionally includes a ramped portion 104 on upper portion 98 of step 96 over a discrete length of discontinuity 70 and, preferably, over at least 10% of the length of step 96, more preferably, at least 20% and, most preferably 30%. Ramp 104 is angled with respect to upper surface 46' at an angle B in a range of 1.5° to 4.0°, more preferably in a range of 1.75° to 3.5° and, most preferably 2.0° to 3.0°. In this manner, surface discontinuity 70 comprises a sharp discontinuity in the outer surface of the exterior rearview mirror housing which provides for an effective and substantial reduction in the wind noise.

Figure 14:
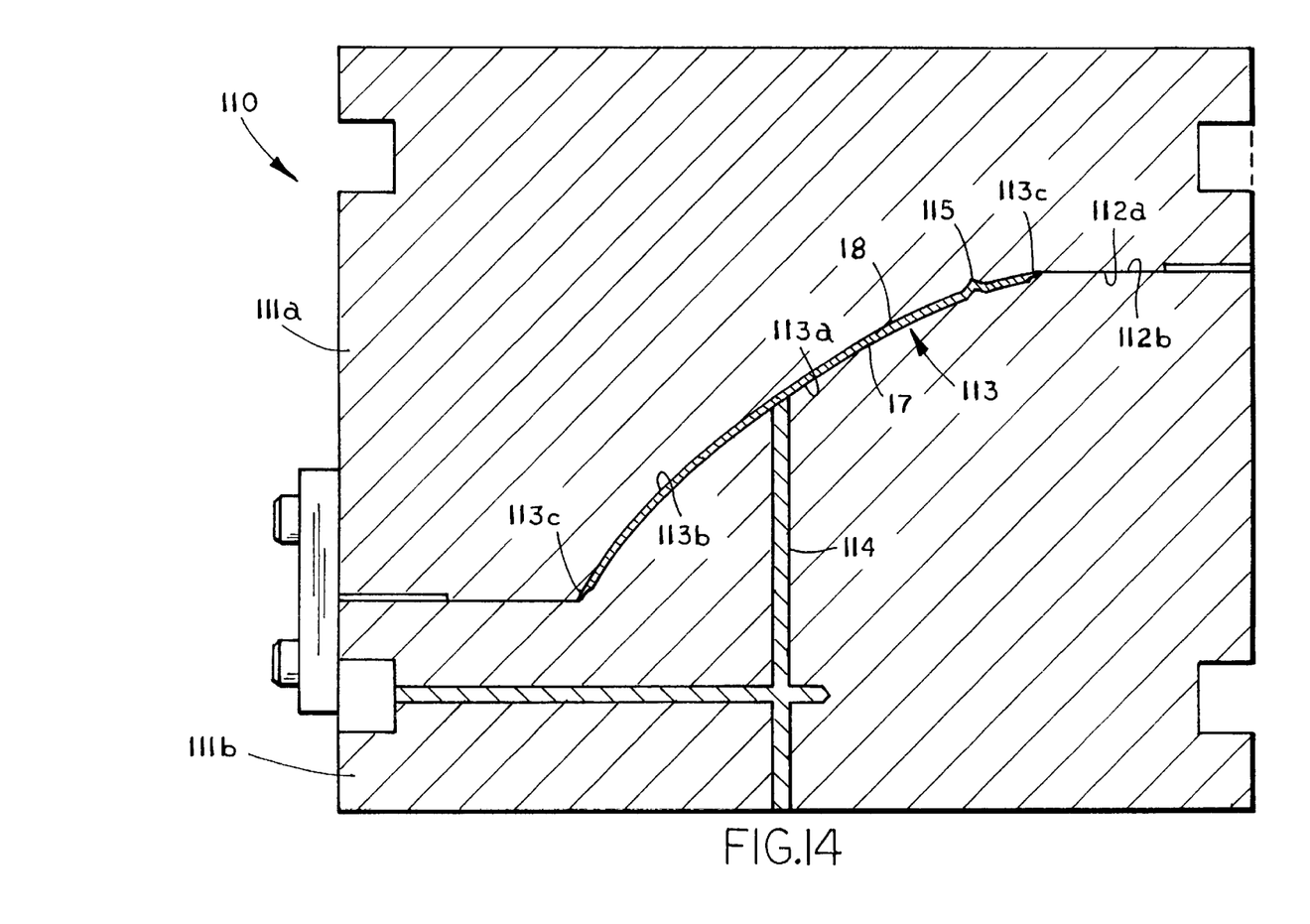
FIG. 14 is a cross-section of a mold apparatus for forming a composite shell of the present invention.

Composite shell 16 is preferably formed by a high pressure and/or high temperature injection mold apparatus. Referring to FIG. 14, a suitable molding apparatus 110 comprises a single mold apparatus and includes first and second plates 111a and 111b, respectively, each defining first and second parting lines 112a and 112b, respectively. Plates 111a and 111b are respectively configured to define a mold cavity 113 therebetween. First surface 113a of mold cavity 113 is configured for forming the exterior surface of composite shell 16 and, therefore, has a generally concave shape. Second surface 113b of mold cavity 113 is configured for forming the inner surface of composite shell 16 and, therefore, has a generally convex shape. Although illustrated as a vertical mold apparatus, it should be understood, that the orientation of the plates and/or the mold cavity within the mold assembly can be reoriented. For example, the plates may comprise side plates which move along a horizontal axis together, or the mold cavity may be inverted.

First surface 113a includes a discontinuity 114, such as a ridge, with an edge definition for forming the surface discontinuity 70. The polymer resin forming the shell substrate is injected into cavity 113 by a runner system 114, which is in fluid communication with mold cavity 113 and in fluid communication with a nozzle (not shown) of a conventional injection machine. Preferably, runner system 114 is centrally located and configured within the lower plate to direct the polymer resin to mold cavity through one or more gates, as would be understood by those skilled in the art. In this manner, the resin material is injected uniformly into mold cavity 113. It should be understood that the number of gates can be increased as needed to increase the flow of the resin material to assure a more uniform flow.

After loading the film substrate into mold cavity 113, which is preferably held in place by suction, such as a vacuum suction, as is known in the art, and after the mold is closed, the polymer resin material is injected into mold cavity 113. In this manner, when the mold halves are pressed together, the film and resin completely fill the mold cavity and further precisely conform to the edge definition of the ridge so that film 18 and shell substrate 17 have molded therein discontinuity 70. Upon filling the mold cavity and completing the appropriate temperature and/or pressure process cycle, which varies depending on the material forming shell substrate, the mold is then opened so that the molded composite shell can be removed for installation.

In preferred form, mold cavity 113 also includes flange cavity portions 113c, 113d for forming an annular flange 107 on shell 16 for forming a mounting flange. Preferably, film 18 extends at least partially into the flange cavity portions 113c, 113d, as described below.

As best seen in FIGS. 6 and 7, composite shell 16 is preferably molded with an annular flange 107 which provides a mounting flange and aligns with and inserts into a corresponding annular groove 74a formed at perimeter edge 74 of recessed area 48. In addition, film 18 is preferably pre-formed or pre-molded with an annular flange 108 which projects outwardly from perimeter portion 109 of film 18. When composite shell 16 is molded, film 18 extends over substantially the full width and length of the mold cavity so that flange 108 extends over flange 107 and anchors shell 18 onto substrate 17 when composite shell 16 is mounted to casing 12. As illustrated in FIG. 4, when flange 107 is inserted into groove 74a, flange 108 of film 18 similarly extends into groove 74a so that the entire exposed surface of substrate 17 is covered by film 18, with any remaining uncovered portion of substrate 17 being hidden by mirror case 12 when composite substrate 16 is mounted to mirror case 12.

Figure 3A:
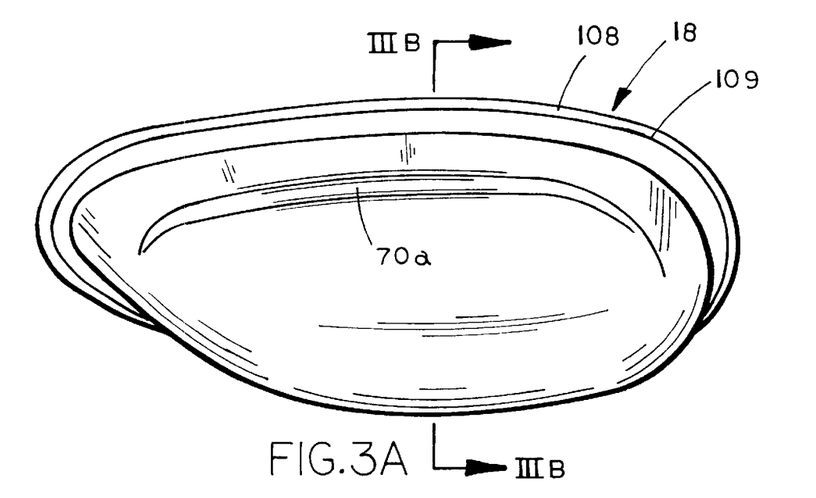
FIG. 3A is a perspective view of the film substrate of the composite skullcap prior to molding.
Figure 3B:
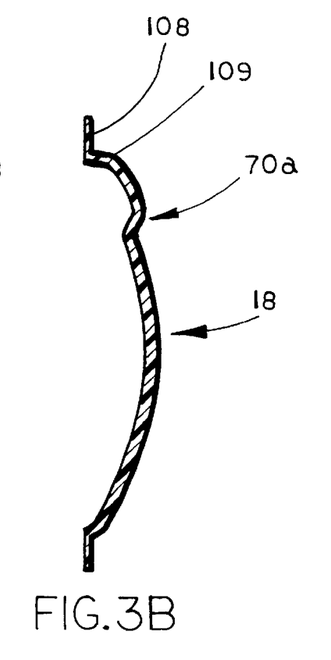
FIG. 3B is a cross-section view taken along line IIIB—IIIB of FIG. 3A.

In the present invention, no liquid paint is used to decorate the shell substrate. As a result, there is no puddling or accumulation of wet paint in the discontinuity which upon drying destroys or deteriorates the edge definition. Instead, film 18 and substrate 17 conform to the edge definition thus maintaining the edge definition integrity. In order to reduce stretching of film 18, film 18 may be pre-formed or pre-molded before molding in mold cavity 113. Referring to FIGS. 3A and 3B, for example, film 18 may be pre-formed by vacuum press molding into the general shape of the desired composite shell 16 and/or formed, also pre-formed, to include a surface discontinuity 70a so that when film 18 is placed in the injection mold apparatus, and molded into composite shell 16 with the polymer resin, the shell will undergo less stretching during the molding process. Preferably, film 18 has a total thickness in a range of approximately 1.0 to 0.25 mils, more preferably, 1.2 to 2.25 mils and, most preferably, 1.5 to 2.0 mils prior to molding onto substrate 17.

Figure 8:
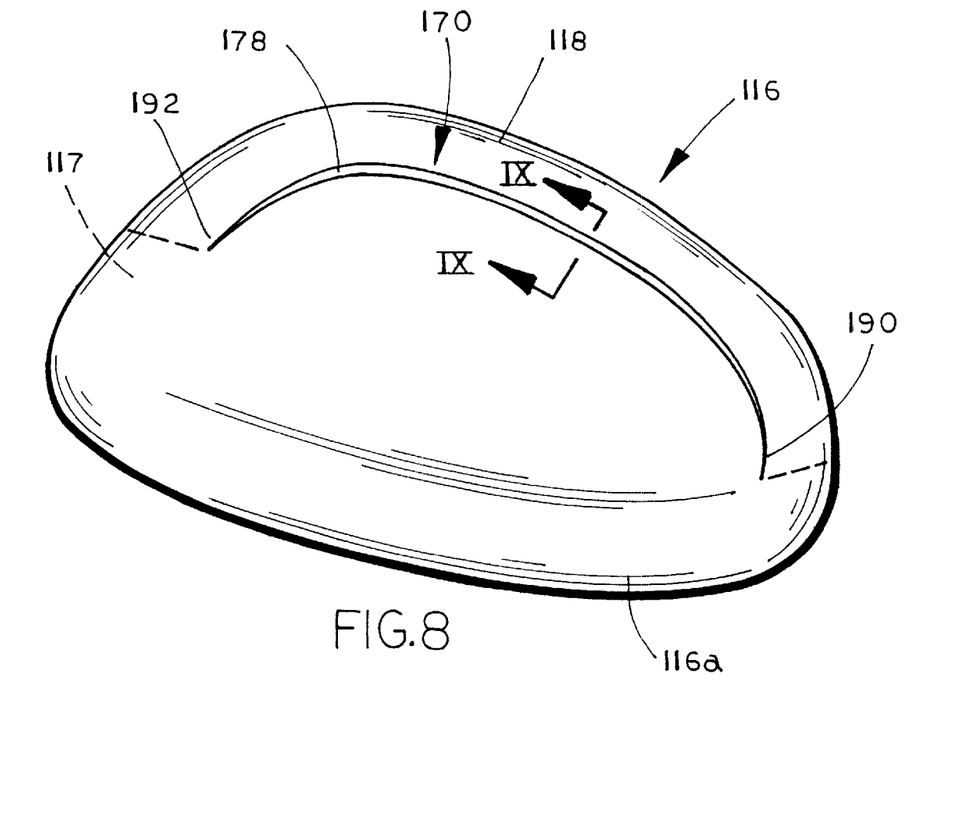
FIG. 8 is an elevation view of a second embodiment of the skullcap of the present invention.
Figure 9:
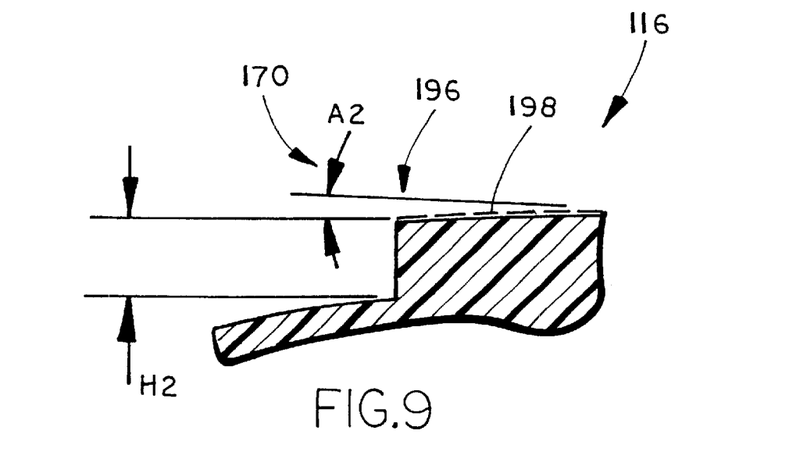
FIG. 9 is a cross-section view taken along line IX—IX of FIG. 8.

Referring to FIG. 8, a second embodiment of composite shell 116 is illustrated. Composite shell 116 includes a substrate 117 and a decorative film 118 which is formed as described in reference to the first embodiment. For further details of the materials of substrate 117 and of film 118 reference is made to composite shell 16. In the illustrated embodiment, composite shell 116 includes a surface discontinuity 170, which comprises a ridge and, preferably, a generally continuous arcuate ridge with terminal ends 190 and 192. Terminal ends 190 and 192 are preferably tapered to provide a smooth transition between surface discontinuity 170 and exterior surface 116a of composite shell 116. In the illustrated embodiment, ridge 178 extends such that terminal ends 190 and 192 terminate above and are spaced in a range of about 10 to 35 mm, more preferably 15 to 30 mm and, most preferably, about 20 to 25 mm from the lower peripheral portion of shell 116 and, further, terminate at a distance generally equal to the length of the upper portion of ridge 178—in other words, terminal ends 190 and 192 do not curve or wrap inwardly like ends 90 and 92 of the first embodiment. However, similar to the previous embodiment, ridge 178 defines a step 196 which has a maximum height of H2 in range of 0.25 to 5.0 mm, more preferably in a range of 0.5 to 4.0 mm and, most preferably, 1.0 to 2.0 mm. Furthermore, surface discontinuity 170 includes a ramp portion 198 over a discrete length of ridge 178 which is angled at an angle A2 in range of approximately about 1.5° to 4.0°, more preferably in a range of about 1.75° to 3.5° and, most preferably about 2.0° to 3.0°.

Figure 10:
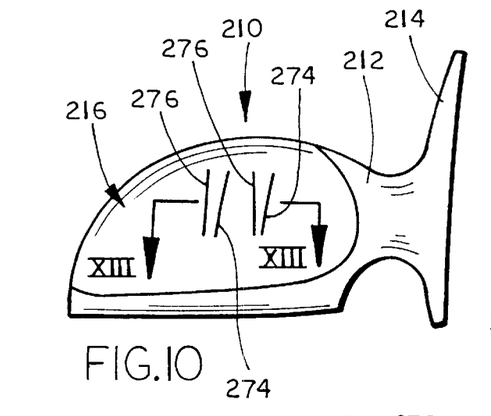
FIG. 10 is a top plan view of an exterior vehicular rearview mirror assembly incorporating a third embodiment of a skullcap of the present invention.
Figure 11:
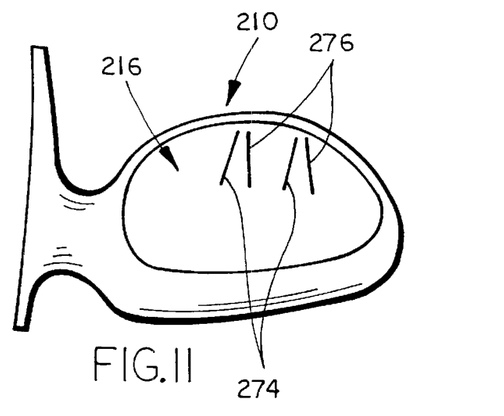
FIG. 11 is a rear elevation view of the exterior rearview mirror assembly of FIG. 10.

Referring to FIGS. 10 and 11, the numeral 210 generally designates another embodiment of a sideview exterior mirror assembly of the present invention. Sideview mirror assembly 210 includes a mirror case 12 and a mounting bracket 214 which mounts mirror case 212 to the side of a vehicle. Further details of the components within sideview mirror case 212 are omitted and, instead, reference is made to the first embodiment. Mounted to the forward facing side of mirror case 212 is a composite shell 216, which provides a decorative covering for at least a portion of casing 212 to enhance the aesthetic appearance of mirror assembly 210. Composite shell 216 is formed from a shell substrate 217 and decorative film 217 in a similar manner to composite shells 16 and 116 and, therefore, reference is made to the previous embodiments for further details.

Figure 12:
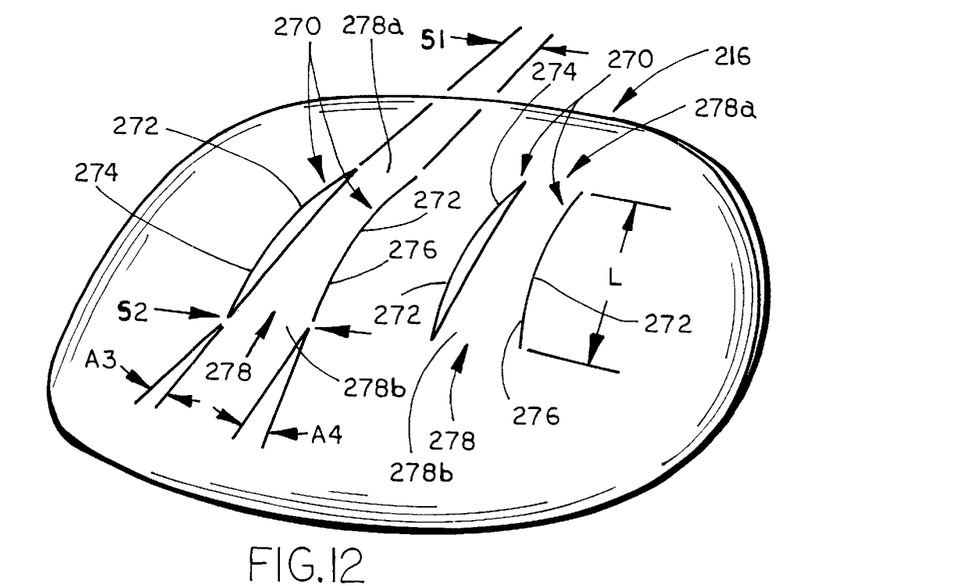
FIG. 12 is an enlarged perspective view of the skullcap of FIG. 10.

As best seen in FIG. 12, composite shell 216 includes a plurality of discontinuities 270, which separate the air flow as it passes over sideview exterior mirror assembly 210. In preferred form, discontinuities 270 comprise a plurality of longitudinally extending ridges 272. Ridges 272 preferably includes a pair of outboard facing steps 274 and a corresponding pair of inboard facing steps 276. Each pair of outboard facing and inboard facings steps 274, 276 define therebetween a groove 278.

As best seen in FIG. 12, grooves 278 taper from their upper portions 278a to their lower portions 278b. It should be understood that reference to "upper portions" and "lower portions" is relative to the orientation of the shell when exterior rearview mirror assembly 210 is mounted to the side of a vehicle. For example, the relative spacings of spacing S1 between steps 274 and 276 at upper portion 278a of groove 278 and of the spacing S2 between steps 274 and 276 at lower portion 278b of groove 278 is such that angle A3 of step 274 is in a range of 2° to 5°, more preferably in a range of 3° to 4° and, most preferably about 3°. Similarly, the angle A4 of step 276 is in a range of 2° to 5°, more preferably in a range of 3 to 4 and, most preferably approximately 3°.

Figure 13:
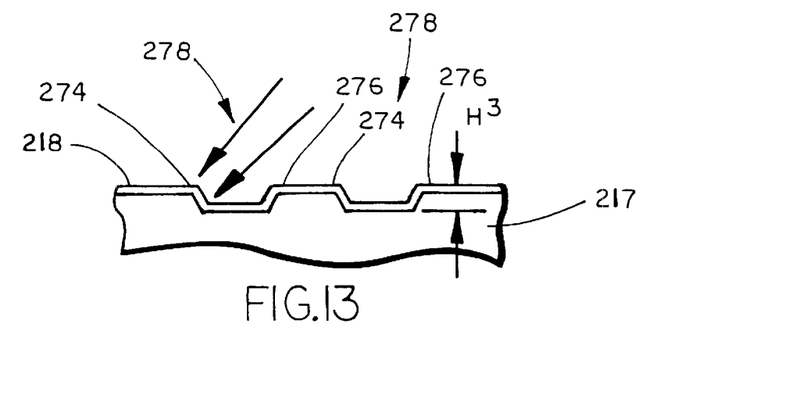
FIG. 13 is a cross-section view taken along line XIII—XIII of FIG. 10.

Referring to FIG. 13, the maximum height H3 of grooves 278 is in a range of 0.25 to 5.0 mm, more preferably 0.5 to 4.0 mm and, most preferably approximately 1.0 to 2.0 mm. It has been found with these discontinuities (270), that the wind noise over exterior rearview mirror assembly 210 is significantly reduced.

It should be understood from the foregoing that these and other variations and modifications may be made without departing from the scope of the invention. For example, though exemplary dimensions and configurations have been provided, the dimensions and configurations may be varied to achieve similar results. Furthermore, though the exterior rearview mirror assemblies have been illustrated in a fixed mounting form, the composite shell of the present invention may be incorporated into a wide variety of mirror assemblies including extendable mirrors, break-away mirrors, and, further, power-fold mirrors, which are commonly known in the art. While several examples of features or accessories for the mirror assemblies have been described, it should be understood that numerous other features or devices may be incorporated into the mirror assemblies.

The above description is considered to be that of the preferred embodiments only. Modification of the invention will occur to those skilled in the art and to those who make or use the invention. Therefore, it is understood that the embodiments shown in the drawings and described above are merely for illustrative purposes only and are intended to limit the scope of the invention, which is defined in the following claims as interpreted according to the principles of patent law including the Doctrine of Equivalents,

We claim:

1. A vehicular sideview exterior mirror assembly comprising:
    a body adapted for mounting to a vehicle, and said body having a mirror case wall defining a cavity and an opening for facing rearward of a vehicle, when said mirror assembly is mounted to a vehicle;
    a reflective element supported in said cavity and positioned in said opening for rearward viewing of the vehicle; and
    said body having a forward facing side, at least a portion of said forward facing side including a decorative film conformed therewith, said body having a surface discontinuity formed therein, and said decorative film extending over said surface discontinuity and substantially conforming thereto to reduce the wind noise of said sideview exterior mirror assembly when mounted to a vehicle.

2. The vehicular sideview exterior mirror assembly according to claim 1, wherein said body includes a shell member mounted to said ford facing side, said shell member comprises a shell substrate and said decorative film conformed with said substrate.

3. The vehicular sideview exterior mirror assembly according to claim 2, wherein said decorative film is preformed with a discontinuity generally following said surface discontinuity of said body to reduce stretching of said film when conformed with said shell member.

4. The vehicular sideview exterior mirror assembly according to claim 2, wherein said surface discontinuity comprises a ridge.

5. The vehicular sideview exterior mirror assembly according to claim 4, wherein said ridge is substantially continuous having a pair of terminal ends.

6. The vehicular sideview exterior mirror assembly according to claim 5, wherein said terminal ends are tapered.

7. The vehicular sideview exterior mirror assembly according to claim 4, wherein said ridge is generally arcuate.

8. The vehicular sideview exterior mirror assembly according to claim 4, wherein said case wall includes a recessed area having a perimeter edge, said shell member having a perimeter edge, said shell member and said case wall defining a substantially continuous exterior surface with a groove formed between said perimeter edge of said recessed area and said perimeter edge of said shell member, and said ridge being spaced from said groove.

9. The vehicular sideview exterior mirror assembly according to claim 8, wherein said ridge has a longitudinal extent generally parallel with said groove.

10. The vehicular sideview exterior mirror assembly according to claim 8, wherein said case wall includes a perimeter edge extending around said opening, said groove being spaced a groove distance from said perimeter edge of said case wall, and said ridge being spaced a ridge distance from said groove, wherein said ridge distance is at least said groove distance.

11. The vehicular sideview exterior mirror assembly according to claim 7, wherein said ridge forms a step.

12. The vehicular sideview exterior mirror assembly according to claim 11, wherein said step has a maximum height in a range of 0.5 to 5.0 mm.

13. The vehicular sideview exterior mirror assembly according to claim 12, wherein said step has a maximum height in a range of 1.0 to 2.0 mm.

14. The vehicular sideview exterior mirror assembly according to claim 1, wherein said body comprises an engineering polymer resin.

15. The vehicular sideview exterior mirror assembly according to claim 14, wherein said body comprises a reinforced polymer resin.

16. The vehicular sideview exterior mirror assembly according to claim 15, wherein said body comprises a filled nylon material.

17. The vehicular sideview exterior mirror assembly according to claim 16, wherein said body comprises a mineral filled nylon material.

18. The vehicular sideview exterior mirror assembly according to claim 2, wherein said shell member comprises an acrylonitrile butadiene styrene material.

19. The vehicular sideview exterior mirror assembly according to claim 1, wherein said decorative film has a thickness in a range of 0.1 to 0.25 mils prior to being conformed to said substrate.

20. The vehicular sideview exterior mirror assembly according to claim 19, wherein said decorative film has a thickness in a range of 0.125 to 0.15 mils prior to being conformed to said substrate.

21. A vehicular sideview exterior mirror assembly comprising:
a reflective element;
a mirror case being adapted to mount to a vehicle and having a mirror case wall defining a cavity and an opening for facing rearward of a vehicle when said vehicular sideview exterior mirror assembly is mounted to the vehicle, said mirror case being adapted to mount to a vehicle, said reflective element housed in said cavity in said first opening for rearward viewing of the vehicle; and
a decorated shell member positioned exteriorly over a portion of said mirror case, said shell member defining a gap between said shell member and said mirror case, said shell member being adapted to secure to said case wall, said decorated shell member comprising a shell substrate and a decorative film conformed therewith, said shell substrate having a surface discontinuity, and said film conformed with said substrate over said surface discontinuity and substantially conforming to said surface discontinuity, and said surface discontinuity being spaced from said gap to reduce the wind noise of said vehicle sideview exterior mirror assembly.

22. The vehicular sideview exterior mirror assembly according to claim 21, wherein said surface discontinuity comprises a ridge.

23. The vehicular sideview exterior mirror assembly according to claim 22, wherein said mirror case has a lateral extent, said ridge having a longitudinal extent extending along at least a portion of said lateral extent.

24. The vehicular sideview exterior mirror assembly according to claim 21, wherein said shell member and said case wall define a substantially continuous exterior surface, said surface discontinuity defining a step in said substantially continuous exterior surface.

25. The vehicular sideview exterior mirror assembly according to claim 24, wherein at least a portion of said surface discontinuity includes a ramp along at least a portion of said step to further enhance the wind noise reduction of said vehicular sideview exterior mirror assembly.

26. The vehicular sideview exterior mirror assembly according to claim 21, wherein said mirror case includes a perimeter edge, said ridge being spaced from said perimeter edge and generally following at least a portion of said perimeter edge.

27. The vehicular sideview exterior mirror assembly according to claim 26, wherein at least a portion of said ridge is generally parallel with said perimeter edge of said mirror case.

28. The vehicular sideview exterior mirror assembly according to claim 21, wherein said case wall includes a recessed area having a perimeter edge, said shell member having a perimeter edge, said shell member and said case wall defining a substantially continuous exterior surface with said gap formed between said perimeter edge of said recessed area and said perimeter edge of said shell member.

29. The vehicular sideview exterior mirror assembly according to claim 28, wherein said gap is spaced a gap distance from said perimeter edge of said case wall, said surface discontinuity being spaced a discontinuity distance from said gap, wherein said discontinuity distance is at least said gap distance.

30. The vehicular sideview exterior mirror assembly according to claim 28, wherein said discontinuity forms a step in said substantially continuous exterior surface.

31. The vehicular sideview exterior mirror assembly according to claim 30, wherein said step having a maximum height in a range of 0.25 to 5.0 mm.

32. The vehicular sideview exterior mirror assembly according to claim 31, wherein said step has a maximum height in a range of 1.0 to 2.0 mm.

33. The vehicular sideview exterior mirror assembly according to claim 21, wherein said mirror case comprises an engineering polymer resin.

34. The vehicular sideview exterior mirror assembly according to claim 33, wherein said mirror case comprises a reinforced polymer resin.

35. The vehicular sideview exterior mirror assembly according to claim 34, wherein said mirror case comprises a filled nylon material.

36. The vehicular sideview exterior mirror assembly according to claim 21, wherein said shell member comprises an acrylonitrile butadiene styrene.

37. The vehicular sideview exterior mirror assembly according to claim 21, wherein said decorative film has a thickness in a range of 0.125 to 0.15 mils prior to being conformed to said substrate.

38. The vehicular sideview exterior mirror assembly according to claim 21, further comprising an actuator, said actuator adjusting an orientation of said reflective element in said opening.

39. The vehicular sideview exterior mirror assembly according to claim 38, wherein said actuator supports said reflective element in said mirror case.

40. The vehicular sideview exterior mirror assembly according to claim 21, wherein said mirror case includes a lateral extent for extending outwardly from the vehicle when said mirror assembly is mounted to a vehicle, and said surface discontinuity comprises a plurality of longitudinal grooves extending generally orthogonal to said lateral extent of said mirror case.

41. A vehicular side view exterior mirror assembly comprising:
a reflective element;
a mirror case being adapted to mount to a vehicle and having a mirror case wall defining a cavity and an opening for facing rearward of the vehicle when said vehicular sideview exterior mirror assembly is mounted to the vehicle, said reflective element housed in said cavity in said opening for rearward viewing of the vehicle when said vehicular side view exterior mirror assembly is mounted to the vehicle; and
a shell member positioned exteriorly over a portion of said mirror case, said shell member being adapted to secure to said case wall and comprising a shell substrate and a decorative film conformed with said substrate to enhance the aesthetic appearance of said vehicular side exterior mirror assembly, and said substrate having a surface discontinuity, and said film extending over said surface discontinuity and substantially conforming thereto to reduce the wind noise of said vehicular side view exterior mirror assembly.

42. The vehicular sideview exterior mirror assembly according to claim 41, wherein said surface discontinuity comprises a ridge.

43. The vehicular sideview exterior mirror assembly according to claim 42, wherein said ridge extends laterally across a forward facing portion of said mirror case.

44. The vehicular sideview exterior mirror assembly according to claim 42, wherein said shell member defines a gap between said shell member and said mirror case, said ridge being spaced from said gap.

45. The vehicular sideview exterior mirror assembly according to claim 42, wherein said mirror casing includes a perimeter edge, said ridge being spaced from said perimeter edge and generally following at least a portion of said perimeter edge.

46. The vehicular sideview exterior mirror assembly according to claim 41, wherein said discontinuity comprises a step in an exterior surface of said shell member.

47. The vehicular sideview exterior mirror assembly according to claim 46, wherein said discontinuity includes a lateral extent, said step having a varying height along said lateral extent.

* * * * *

UNITED STATES PATENT AND TRADEMARK OFFICE
CERTIFICATE OF CORRECTION

| | | |
|---|---|---|
| PATENT NO. | : 6,419,300 B1 | |
| APPLICATION NO. | : 09/482199 | |
| DATED | : July 16, 2002 | |
| INVENTOR(S) | : Leo W. Pavao and Tun-Jen Chu | |

It is certified that error appears in the above-identified patent and that said Letters Patent is hereby corrected as shown below:

Column 4:
Line 65, "fist" should be --first--.

Column 5:
Line 18, "entirely" should be --entirety--.
Line 25, "091350,930" should be --09/350,930--.
Line 30, "flow" should be --now--.
Line 43, "race" should be --surface--.
Lines 45-53 "U.S. Pat. No. 6,168,279, and to U.S. Pat. Nos. 5,900,999; 5,986,354, all commonly assigned to Donnelly Corporation of Holland, Mich., the disclosures of which ate herein incorporated by reference in their entireties. An example of a suitable mounting bracket can be found in pending U.S. patent application entitled FILLED POLYOLEFIN MIRROR SUPPORT, Ser. No. 09/097,480, filed Jun. 15, 1998, now U.S. Pat. No. 6,109,586, which is incorporated by reference herein in its entirety." should be --an alloy of aluminum and silver. Most preferably, the front most surface of the rear substrate (the third surface as is known in the mirror art) is reflector coated with a high reflecting metal film such as aluminum or silver, or an alloy of aluminum or silver. It should be understood that other reflective elements may also be incorporated into sideview mirror assembly 10.--.

UNITED STATES PATENT AND TRADEMARK OFFICE
CERTIFICATE OF CORRECTION

PATENT NO. : 6,419,300 B1
APPLICATION NO. : 09/482199
DATED : July 16, 2002
INVENTOR(S) : Leo W. Pavao and Tun-Jen Chu It is certified that error appears in the above-identified patent and that said Letters Patent is hereby corrected as shown below:

Column 6:
Line 22, Insert --now U.S. Pat. No. 6,168,279,-- after "Mar. 25, 1998,".
Line 29, Insert --now U.S. Pat. No. 6109586,-- after "Jun. 15, 1998,".

Column 7:
Line 4, "spice" should be --surface--.
Line 9, "," should be --.-- after "46".

Column 11:
Line 37, "3 to 4" should be --3° to 4°--.
Line 70, "," should be --.--.

Column 12:
Line 21, Claim 2, "ford" should be --forward--.

Column 14:
Line 16, Claim 31, "having" should be --has--.

Signed and Sealed this

Twenty-second Day of August, 2006

JON W. DUDAS
*Director of the United States Patent and Trademark Office*